United States Patent [19]

Kelley

[11] Patent Number: 5,014,569
[45] Date of Patent: May 14, 1991

[54] MOTION TRANSMITTING REMOTE CONTROL ASSEMBLY AND METHOD FOR MAKING SAME

[75] Inventor: Dixon L. Kelley, New Baltimore, Mich.

[73] Assignee: Teleflex Incorporated, Limerick, Pa.

[21] Appl. No.: 497,616

[22] Filed: Mar. 23, 1990

[51] Int. Cl.$^5$ .............................................. F16C 1/10
[52] U.S. Cl. .................. 74/502.4; 74/502.5; 74/502.6
[58] Field of Search ................ 74/502.6, 502.5, 502.4, 74/500.5

[56] References Cited

U.S. PATENT DOCUMENTS

| | | | |
|---|---|---|---|
| 3,393,534 | 7/1968 | Hanebuth | 74/502.4 X |
| 3,424,027 | 1/1969 | Tschanz et al. | 403/165 X |
| 3,938,395 | 2/1976 | Henecke | 74/500.5 X |
| 4,872,367 | 10/1989 | Spease | 74/502.4 X |
| 4,895,041 | 1/1990 | Cunningham | 74/502.4 |
| 4,936,161 | 6/1990 | Polando | 74/502.6 |

FOREIGN PATENT DOCUMENTS

| | | | |
|---|---|---|---|
| 529837 | 7/1957 | Belgium | 74/502.4 |
| 779083 | 3/1935 | France | 74/502.4 |
| 589941 | 7/1947 | United Kingdom | 74/502.5 |

*Primary Examiner*—Rodney M. Lindsey
*Attorney, Agent, or Firm*—Reising, Ethington, Barnard, Perry & Milton

[57] ABSTRACT

A motion transmitting remote control assembly of the type for transmitting forces along a curved path. The assembly (10) includes a conduit assembly (12) having first (16) and second (17) end fittings thereon for mounting to a support structure. A flexible core element (30) is moveably supported by the conduit assembly (12) and has a slug (34) secured to one end thereof for movement with the core element (30). A shaft (22, 22') is disposed about and retained on the core element (30) by the slug (34). The shaft (22, 22') defines a channel (32, 32') with an opening (37, 37') at one end thereof for receiving the slug (34) into the channel (32, 32'). A plug (33) is disposed in the opening (37, 37') to retain the slug (34) in the channel (32, 32'). A terminal member (36) is molded to the one end of the shaft (22, 22') about the plug (38) and the opening (37, 37') for connection to a controlled member. The assembly (10) includes a telescopic guide assembly (15, 15', 15'') for telescopically supporting the shaft (22, 22') for longitudinal movement of the shaft (22, 22') relative to the conduit assembly (12). A method is also provided for making the assembly (10).

18 Claims, 3 Drawing Sheets

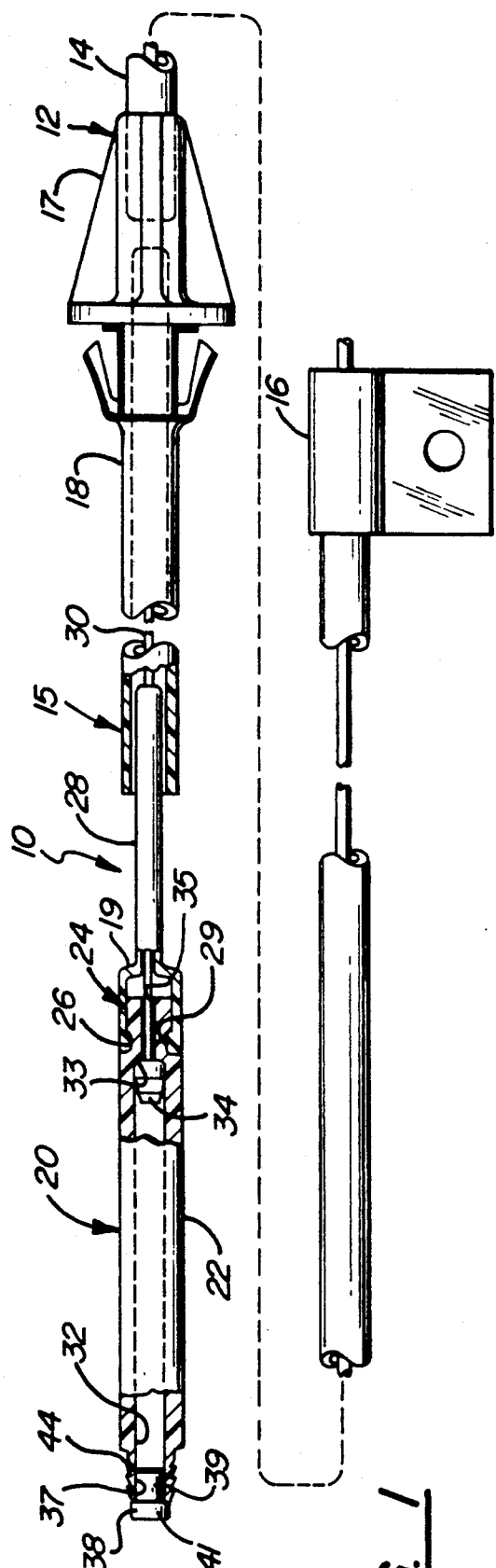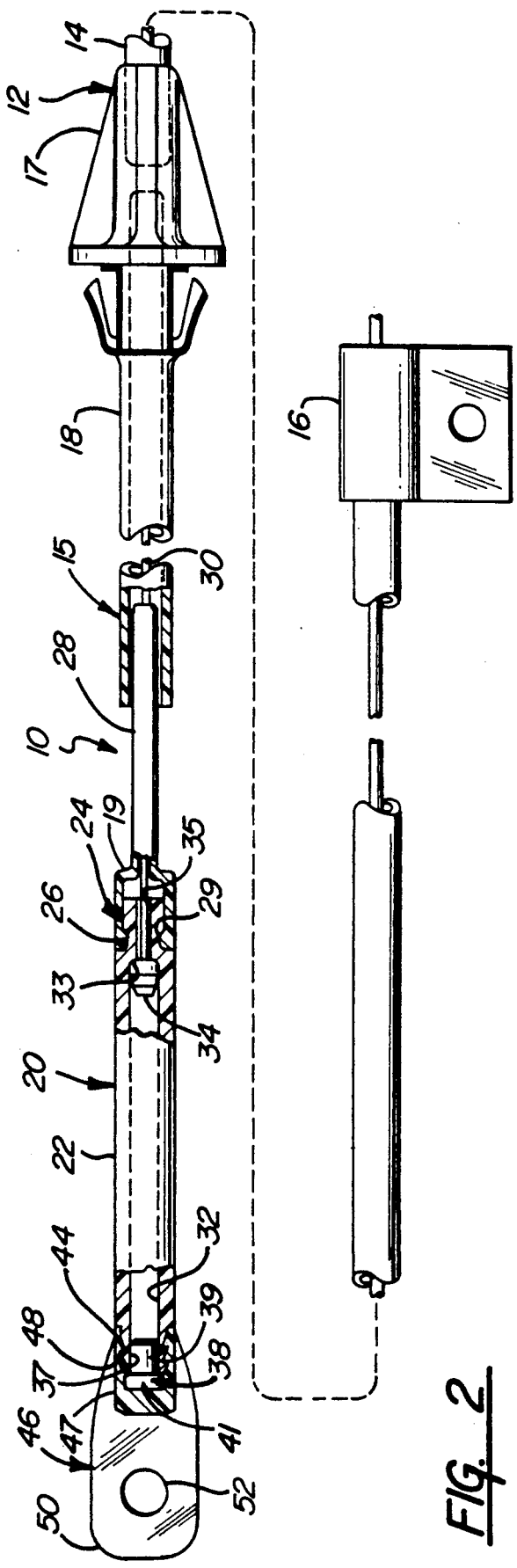
FIG. 1
FIG. 2

MOTION TRANSMITTING REMOTE CONTROL ASSEMBLY AND METHOD FOR MAKING SAME

TECHNICAL FIELD

The instant invention relates to a motion transmitting remote control assembly of type wherein motion is transmitted in a curved path by a flexible motion transmitting core element moveably supported by a flexible conduit.

BACKGROUND ART

Motion transmitting remote control assemblies of the type utilizing motion transmitting core elements have many uses in automotive environments. One such use is in connection with an engine throttle control.

A typical lost motion remote cruise control assembly is disclosed in U.S. Pat. No. 4,872,367 to Spease, issued Nov. 10, 1989, and assigned to the assignee of the present invention. The assembly includes a tubular member extending from one end of a conduit. A coupling member is slideably supported within the tubular member for relative telescopic movement therewith. The coupling member includes an integral terminal portion extending from one end thereof for connecting the coupling member with a controlled member (the throttle linkage assembly). A flexible core element is moveably supported by the conduit and extends through the tubular member and into a channel disposed within the coupling member. A slug is fixedly attached to the extended end of the core element and is slideably retained within the channel to effectuate a lost motion connection between the core element and the coupling member. The coupling member has an elongated opening along the length thereof for receiving the slug into the channel. A protective shroud is disposed about the coupling member to prevent the slug from escaping through the elongated opening. The terminal portion of the coupling member further acts as a stop for preventing the escapement of the slug from the end of the channel.

It is typical for the throttle linkage to vary in design from one application to another. As such, the terminal portion of the coupling member must have a size and shape which conforms to the design requirements of a specific application. In other words, the design of the throttle linkage in each application will govern the necessary size and shape of the terminal portion. Although the size and shape of the terminal portion may change from one application to another, the remaining components of the assembly remain unchanged and are generic to all applications.

With the above prior art assembly, the particular application must be known prior to assembling the remaining generic components since the variably shaped terminal portion is formed integrally with the coupling member. Without the coupling member, the remaining components of the assembly can not be assembled.

U.S. Pat. No. 3,424,027 to Tschanz et al, issued Jan. 28, 1969, discloses a motion transmitting remote control assembly having a terminal member moveably secured to the core element.

SUMMARY OF THE INVENTION AND ADVANTAGES

According to the present invention, there is provided a versatile motion transmitting remote control assembly of the type for transmitting forces along a curved path by a motion transmitting core element. The assembly comprises; conduit means for establishing a path, a flexible core element moveably supported by the conduit means with an enlarged end portion extending from the conduit means, a connector member having a pocket therein with an opening at one end thereof for receiving the enlarged end portion of the core element into the pocket. The assembly is characterized by including a plug disposed in the opening to retain the enlarged end portion of the core element in the pocket.

A method is also provided for making a remote control assembly including; a conduit assembly, a flexible core element moveably supported by the conduit assembly with ends thereof extending from the ends of the conduit assembly, a slug 34 secured to one end of the core element, a shaft defining a channel therein with an opening at one end thereof and an aperture at an opposite end thereof. The method includes the steps of; positioning the slug into the channel of the shaft, and thereafter disposing the plug into the opening of the shaft to close the channel and thereby retain the slug within the channel.

One advantage of the present invention is that a subassembly of the components of the device which are generic among various applications may be assembled prior to knowing the specific application in which it is be to used. Once the specific application is determined, a terminal member having a size and shape conforming to the specific requirements of a given application may be easily secured to the end of the connecting member about the plug and opening of the connecting member to complete the assembly.

Another advantage is that the smaller, stream-line subassembly may be shipped to a local facility near the end user, thereby recognizing a cost savings in the packaging and shipping of the subassembly units. Each subassembly is lighter and less bulky without the terminal member allowing for more subassembly units to be included per shipping package. Once at the local facility, the appropriate terminal member may be easily attached to meet the end user's specific needs.

Most importantly, there is a tremendous decrease in the time required to fill a customer order. The manufacturer may stock several subassembly units so that when a customer order is received, the manufacturer can quickly and efficiently fill the order by simply attaching the appropriately designed terminal member to the subassembly. Accordingly, the manufacturer is better able to provide his customers with faster service and a lower cost product.

FIGURES IN THE DRAWINGS

Other advantages of the present invention will be readily appreciated as the same becomes better understood by reference to the following detailed description when considered in connection with the accompanying drawings wherein:

FIG. 1 is a side view of the preferred embodiment made in accordance with the subject invention shown partially broken away and in cross section;

FIG. 2 is a view like FIG. 1 including a terminal member attached to the connector member;

DETAILED DESCRIPTION OF THE DRAWINGS

Figure 3:
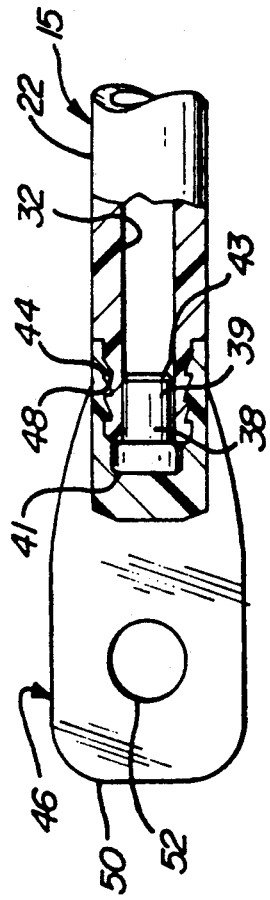
FIG. 3 is an enlarge fragmentary cross-sectional view of the connection between the connector member and the terminal member.

A preferred embodiment of a motion transmitting remote control assembly of the type for transmitting forces along a curved path by a motion transmitting core element is shown in FIGS. 1-5.

The assembly 10 includes conduit means or assembly 12 for establishing a path. The conduit assembly 12 includes a flexible conduit 14. The conduit 14 is preferably of the type including an inner tubular member made of an organic polymeric material and surrounded by a plurality of long lay wires disposed helically thereabout with a casing of organic polymeric material disposed about the long lay wires and the inner tubular member. The conduit means 12 may include first 16 and second 17 end fittings disposed on the conduit 14 for securing the conduit 14 to a support structure (not shown). The end fittings 16, 17 are preferably molded from a rigid organic polymeric material about the conduit 14.

A flexible core element 30 is moveably supported by conduit 14 and has an enlarged end portion 34 extending from one end of the conduit 14. The enlarged end portion 34 comprises a zinc alloy slug 34 molded onto one end of the core element 30 for movement with the core element 30.

A connector member 20 is disposed about and retained on the core element 30 by the slug 34. The connector member 20 comprises a cylindrical thin-walled shaft 22 extending between a free end and an opposite end with a pocket or cylindrical channel 32 therein into which the slug 34 of the core element 30 is disposed. The shaft 22 has an opening 37 formed as an extension of the channel 32 in the free end for receiving the slug 34 into the channel 32. An inner engaging wall 33 is formed within the channel 34 opposite the opening 37 and has an aperture 35 therethrough dimensioned for slideably receiving the core element 30 into the channel 32 while preventing escapement of the slug 34. Plug means or plug 38 is disposed into the opening 37 for closing the channel 32 and to retain the slug 34 within the channel 32 and to prevent foreign matter from entering the channel 32 through the opening 37 during shipping. The shaft 22 is elongated to slideably retain the slug 34 within the channel 32 for movement of the slug 34 along the channel 32 between the engaging wall 33 and plug 38 to effect a lost motion connection between the shaft 22 and the core element 30. In other words, the slug 34 is not fixedly secured within the channel 32, but is slideably retained therein. This allows for relative longitudinal movement between the core element 30 and the shaft 22 to define the lost motion connection therebetween. With the plug 38 disposed an opening 37, the only passage into the channel 32 is through aperture 35, thus minimizing the egress of dirt and moisture into the channel 32.

The plug 38 includes a cylindrical shank portion 39 dimensioned to be press-fitted into the opening 37 to resist removal. The plug 38 also includes an enlarged cylindrical cap portion 41 disposed over the opening 37 and extending from the free end of the shaft 22 for limiting the insertion of the plug 38 into the opening 37. A chamfer 43 is formed on the end of the shank portion 39 for guiding the insertion of the plug 38 into the opening 37. The cap portion 41 has an outer dimension which is less than the outer dimension of the connector member 20 so that no part of the cap portion 41 is extended radially beyond the free end of the connector member 20, assuring that the plug 38 will not be inadvertently dislodged during handling.

The assembly 10 further includes terminal means or member 46 disposed about the opening 37 of the connector member 20 and the plug 38 for connecting the assembly 10 to the controlled member. The terminal member 46 comprises a cylindrically shaped cap 47 and a blade-like flange 50 extending from the cap 47 with a hole 52 therethrough for connection to the controlled member. The flange 50 may have any of a number of possible sizes and shapes depending upon the specific application in which it is to be used. The connector member 20 and the terminal member 46 include coacting mating surfaces 44, 48 for preventing relative longitudinal movement between the connector member 20 and the terminal member 46. Specifically, the connector member 20 and the terminal member 46 include a plurality of longitudinally spaced, oppositely disposed annular barb-shaped projections formed about the free end of the shaft 22 and within the cap 47 of the terminal member 46, respectively, defining annular planar mating surfaces 44, 48 disposed perpendicular to the longitudinal axis of the connector member 20. The mating surfaces 44 of the shaft 22 face longitudinally away from the terminal member 46, whereas the mating surfaces 48 of the terminal member 46 face away from the shaft 22 to mate with the surfaces 44 of the shaft 22. In this manner, the terminal member 46 is fixedly attached to and extends from the free end of the shaft 22. Preferably, the terminal member 46 is molded to the free end of the shaft 22 so that the cap 47 of the terminal member 20 is molded about the cap portion 41 of the plug 38 and the opening 37 of the shaft 22 and about the barb-shaped projections of the shaft 22 so as to interlock the terminal member 46 and the shaft 22 20 via the mating surfaces 44, 48. The plug 38 thus allows the terminal member 46 to be molded to the free end of the shaft 22 while preventing the molded material of the terminal member 46 from entering the channel 32 during molding. The cap 47 of the terminal member 46 has an outer dimension and cylindrical shape identical to that of the shaft 22 and appears as a smooth, continuous extension of the shaft 22.

The assembly 10 also includes telescopic guide means or assembly 15 disposed between the connector member 20 and the conduit means 12 and about the core element 30 for telescopically guiding the connector member 20 relative to the conduit means 12. The telescopic guide means 15 includes a conduit extension member 18 secured to the second end fitting 17 and extending from the conduit 14.

The telescopic guide means 15 may further include a connector extension member 28 extending from and moveable with the connector member 20 for sliding telescopic movement relative to the conduit extension member 18 over a predetermined overlapping length therebetween to telescopically support the connector member 20 for longitudinal movement relative to the conduit 14. Specifically, the connector extension member 28 is secured to the opposite end of the shaft 22 and extends outwardly therefrom toward and into telescopic engagement with the conduit extension member 18. The connector extension member 20 is thus moveable relative to the conduit extension member 18 in a telescopic manner so that portions of the connector extension member 20 overlap portions of the conduit extension member 18.

The telescopic guide means 15 acts with the lost motion connection between the shaft 22 and the core element 30 to allow longitudinal movement of the core element 30 within the channel 32 while simultaneously allowing for relative telescoping movement between the connector extension member 28 and the conduit extension member 18.

The telescopic guide means 15 further acts as a shroud about the core element 30 to prevent dirt and moisture from accumulating on the core element 30 and entering the channel 32 of the shaft 22 through aperture 35.

The shaft 22 has a reduced diameter portion generally indicated at 24 on its opposite end with an annular groove 26 extending about the reduced diameter portion 24 for connection with the connector extension member 28.

The connector extension member 28 is a thin-walled tubular structure extending between a first end secured to the shaft 22 and a second free end opposite the first end. The connector extension member 28 includes an inner annular lip or ridge 29 formed on its first end and extending radially into the connector extension member 28 for engagement with the groove 26 to prevent relative longitudinal movement between the shaft 22 and the connector extension member 28. The connector extension member 28 is preferably molded from an organic polymeric material which is slightly flexible to allow push-on, snap together attachment of the connector extension member 28 onto the shaft 22.

As illustrated in FIGS. 1, 2, 4 and 5, the connector extension member 28 may take the form of a cylindrical male slider member 28 and the conduit extension member 18 may take the form of a cylindrical female conduit extension member 18 for slideably supporting the male slider member 28 for telescopic movement of the male slider member 28 within the female conduit extension member 18 over the predetermined overlapping length therebetween.

Figure 4:
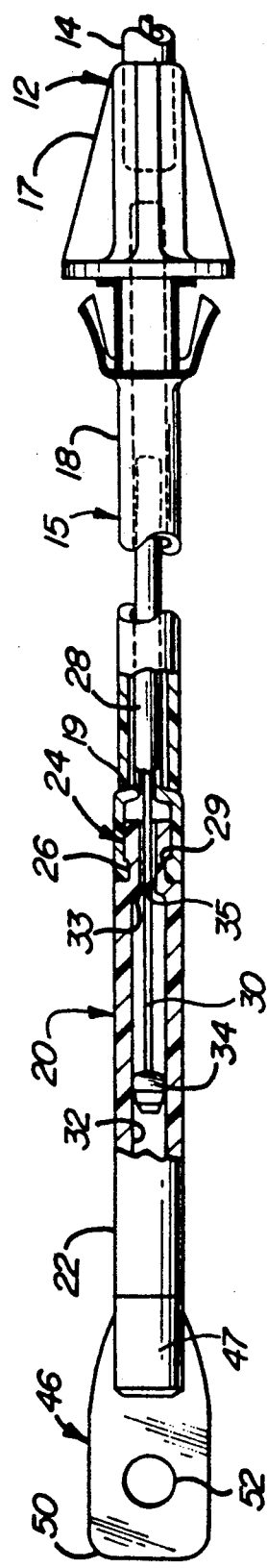
FIG. 4 is a fragmentary side view of the preferred embodiment partially broken away and in cross section showing the connector extension member extended fully into the conduit extension member in the non-actuated condition.
Figure 5:
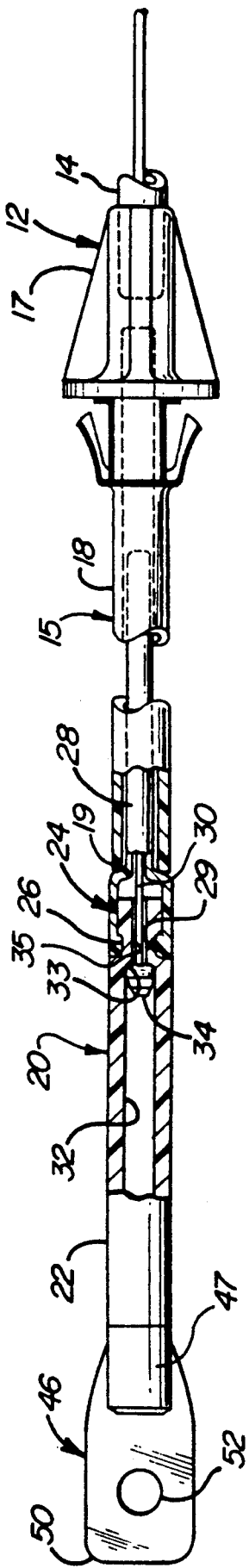
FIG. 5 is a view like FIG. 4 but with the slug engaged with the connector member in the actuated condition.

The male slider member 28 includes a connecting portion on the first end of the connector extension member 28 having an outer dimension identical to that of the shaft 22 and including the inner lip 29 for attachment to the groove 26 of the shaft 22, and a reduced diameter portion extending from the connection portion to the free end of the connector extension member 28. The reduced diameter portion is dimensionally smaller than the connecting portion for receipt within the female conduit extension member 18. The female conduit extension member 18 may have an outer diameter substantially identical to that of the connecting portion of the male slider member 28 and the shaft 22 so that when the male slider member 28 is fully received within the female conduit extension member 18 as shown in FIGS. 4 and 5, the connecting portion of the male slider member 28 and the female conduit extension member 18 appear as a continuous extension of the shaft 22.

The male slider member 28 includes a shoulder 19 defined by the transition from the connecting portion to the reduced diameter portion for engaging with the female conduit extension member 18 to limit the insertion of the male slider member 28 within the female conduit extension member 18.

A distinguishable feature of the subject invention is that the terminal 46 serves only to connect a subassembly comprising the connector member 20, telescoping means 15, conduit means 12, and core element 30 to the controlled member (not shown). The terminal member 46 in no way contributes to nor affects the functioning of the lost motion action of the subassembly 20, 15, 12, 30. As such, a generic subassembly comprising the connector member 20, telescoping means 15, conduit means 12 and core element 30 may be assembled independently of the terminal means 46, as shown in FIG. 1. Once the specific application is determined, a terminal member 46 having a flange portion 50 with a size and shape designed for the specific application may be molded onto the subassembly 20, 15, 12, 30 to complete the assembly 10 as shown in FIG. 2.

In operation, the components of the assembly 10 are initially positioned as shown in FIG. 2. When the cruise control is not engaged, the controlled member (throttle linkage) is independently actuated by an accelerator pedal and cable assembly (not shown). When the controlled member is actuated by the accelerator assembly, the connector member 20 is forced to the right as seen in FIG. 4 by movement of the terminal member 46 in response to movement of the controlled member. The connector extension member 28 moves with the connector member 20 and telescopically retracts into the conduit extension member 18 with the core element 30 and slug 34 remaining stationary. The slug 34 does not hinder the movement of the connector member 20 since the slug 34 is slidably received within the channel 32 in a lost motion connection. The connector member 20 is thus moveable relative to the slug 34 and core element 30. The lost motion connection thereby permits the accelerator assembly to actuate the controlled member independently of the cruise control assembly 10 when the assembly 10 is not actuated.

Upon actuation of the assembly 10, the core element 30 is moved to the right, as seen in FIG. 5. This causes the slug 34 to engage the engaging wall 33 of the shaft 22 preventing the return of the control member 20. As such, the vehicle is maintained at a constant velocity.

Figure 6:
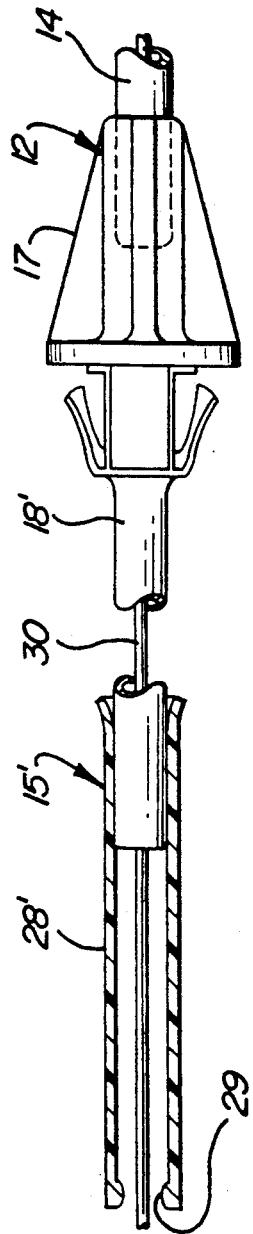
FIG. 6 is a side view of an alternative telescoping guide means shown partially broken away and in cross section including a female connector extension member slideably supported by a male conduit extension member.
Figure 7:
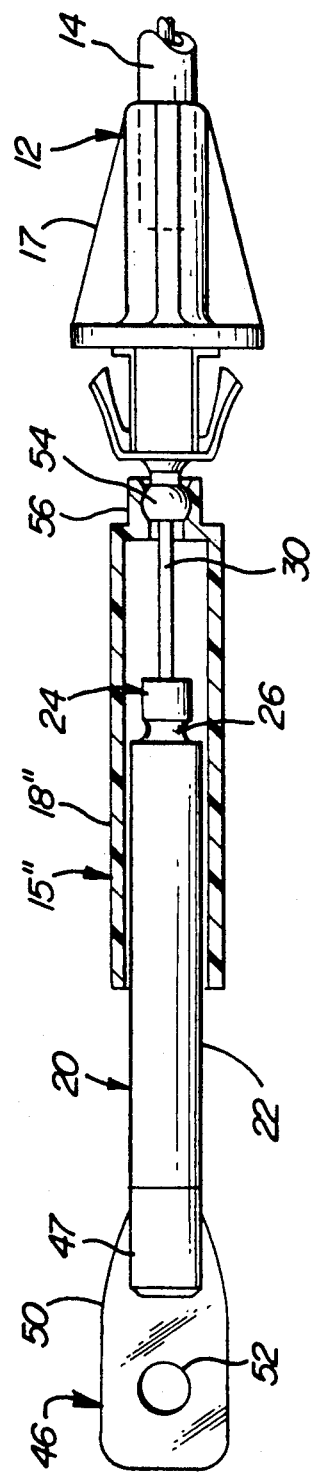
FIG. 7 is a side view of another alternative telescoping guide means shown partially broken away and in cross-section with the female conduit extension member pivotally supported by the conduit assembly.

FIGS. 6 and 7 show alternative embodiments of the telescopic guide means 15', 15", In FIG. 6, the connector extension member 28' comprises an elongated female slider member 28' and the conduit extension member 18' comprises an elongated male conduit extension member 18' slideably supporting the female slider member 28' for telescopic movement of the female slider movement 28' about the male conduit extension member 18' over the predetermined overlapping length. That is, the male and female components are simply reversed. The operation, however, remains unaffected. The female slider member 28' is a thin-walled cylindrical tube having an inner diameter dimensioned to slideably receive the male conduit extension member 18' and an outer diameter substantially the same as that of the connector member 20 so that when the male conduit extension member 18' is fully received within the female slider member 28', the terminal means 15' appears as a continuous extension of the connector member 20.

In FIG. 7, the conduit extension member 18″ comprises a female conduit extension member 18″ pivotally connected to the conduit means 12 for pivotal movement of the female conduit extension member 18″ relative to the conduit means 12. Specifically, the female conduit extension member 18″ includes a socket 56 and the conduit means 12 includes a ball 56 for engagement with the socket 56 to pivotally interconnect the conduit means 12 and the female conduit extension member 18″. The female conduit extension member 18″ is a thin-walled cylindrical tube having an inner diameter dimensioned to slideably receive the connector member 20 therein and an outer diameter which is greater than that of the connector member 20.

Figure 8:
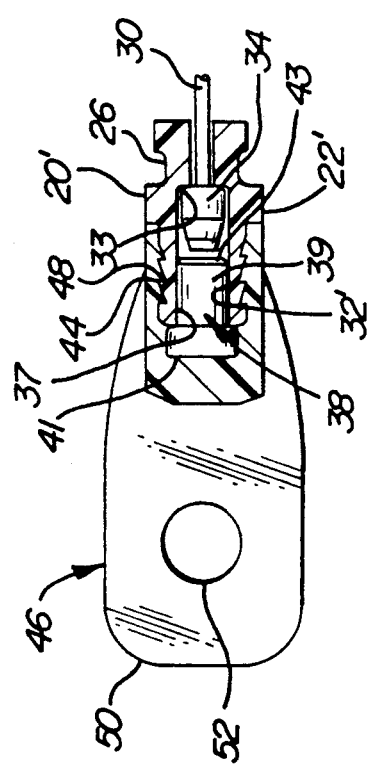
FIG. 8 is an enlarged cross-sectional view of an alternative connector member.

Turning to FIG. 8, an alternative connector member is generally indicated at 20'. The alternative connector member 20' differs from the preferred connector member 20 in that the length of the channel 32' is substantially decreased so that there is effectively no lost motion between the core element 30 and the connector 20'. In other words, the length of the shaft 22', and thus the channel 32', is shortened in order to capture the slug 34 between the engaging wall 33 and the plug 38 to prevent relative longitudinal movement between the shaft 22' and the core element 30. There may, however, be a small spacing between the plug 38 and the slug 34 as a result of necessary manufacturing tolerances incorporated into the design to prevent damage caused by over-insertion of the plug 38 into the channel 32' and against the slug 34. Thus, the alternative connector member 20' differs from the preferred connector member 20 only in the length of the channel 32'. The operation of an assembly employing this alternative connector member 20' is similar in all respects to the preferred embodiment 10 except that there is no lost motion action between the core element 30 and the connector member 20'. Thus, when the connector member 20' is used together with either the preferred telescoping means 15 or the alternative telescoping means 15', the assembly may serve as a throttle control.

A method is also provided for making a motion transmitting remote control assembly 10 in accordance with the present invention. The conduit extension member 18, 18', 18‴ is secured to one end of the conduit 14. The connector extension member 28, 28' is secured to the connector member 20, 20'. The core element 30 is extended through the conduit 14, conduit extension member 18, 18' and connector extension member 28, 28' and into the channel 32, 32' of the shaft 22, 22' through aperture 35. The core element 30 is further extended out of the shaft 22, 22' through an opening 37. The slug 34 is then secured to the end of the core element 30, extending from the shaft 22, 22' such as by molding, and is introduced into the channel 32, 32' by drawing the core element 30 back through the aperture 35. The shank portion 39 of the plug 38 is disposed into the opening 37 to close off the channel 32, 32' and thereby retain the slug 34 within the channel 32, 32'. Thereafter, a terminal member 46 having a predetermined size and shape is attached to the free end of the shaft 22, 22', such as by molding, about the cap portion 41 of the plug 38 and the opening 37 for attaching the assembly 10 to the controlled member (not shown).

When making a motion transmitting remote control assembly 10 using the female conduit extension member 18″, as shown in FIG. 7, it will be appreciated that the method of making the assembly 10 is identical to that described above except that the core element 30 is not extended through a connector extension member after being extended through the conduit 14, but rather is extended directly into the channel 32, 32' of the shaft 22, 22', since there is provided no connector extension member with this embodiment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly of the type for transmitting forces along a curved path by a motion transmitting core element, said assembly comprising:

conduit means (12) for establishing a path;

a flexible core element (30) moveably supported by said conduit means (12) with an enlarged end portion (34) extending from said conduit means (12), a connector member (20, 20') defining a pocket (32, 32') therein with an opening (37) at one end of said pocket (32, 32') for receiving said enlarged end portion (34) of said core element (30) into said pocket (32, 32'), terminal means (46) disposed on said connector member (20, 20') for connection to a control member, characterized by including plug means (38) disposed in said opening (37) between said terminal means (46) and said pocket (32, 32') for closing said pocket (32, 32') to capture and retain said enlarged end portion (34) of said core element (30) within said pocket (32, 32') and to prevent foreign matter from entering said pocket (32, 32') through said opening (37) when said terminal means (46) is disconnected from said connector member (20, 20').

2. An assembly as set forth in claim 1 further characterized by said plug means (38) comprising a plug (38) having a shank portion (39) dimensioned for disposition into said opening (37) and an enlarged cap portion (41) disposed over said opening (37) for limiting the insertion of said plug (38) into said opening (37).

3. An assembly as set forth in claim 2 further characterized by said cap portion (41) having an outer dimension which is less that of said connector member 20, 20' so that no part of said cap portion (41) is extended radially beyond said one end of said connector member (20, 20').

4. An assembly as set forth in claim 3 further characterized by said connector member (20, 20') and said terminal means (46) including coacting mating surfaces (44, 48) for preventing relative longitudinal movement between said connector member (20, 20') and said terminal means (46).

5. An assembly as set forth in claim 5 further characterized by including telescopic guide means (15, 15', 15″) for telescopically guiding said connector member (20, 20') for movement relative to said conduit means (12).

6. An assembly as set forth in claim 5 further characterized by said connector member (20, 20') including an engaging wall (33) disposed opposite said opening (37) and having an aperture (35) therethrough for receiving said core element (30) into said pocket (32, 32').

7. An assembly as set forth in claim 6 further characterized by said connector member (20, 20') comprising a thin-walled tubular shaft (22, 22') defining a channel (32, 32') as said pocket (32, 32').

8. An assembly as set forth in claim 7 further characterized by including a plurality of said mating surfaces (44, 48) comprising longitudinally spaced oppositely disposed annular barb-shaped projections, said projections presenting annular planar surfaces (44, 48) disposed perpendicular to the longitudinal axis of said connector member (20, 20').

9. An assembly as set forth in claim 8 further characterized by said telescopic guide means (15, 15', 15") including a conduit extension member (18, 18', 18") extending from said conduit means (12).

10. An assembly as set forth in claim 9 further characterized by said shaft (22, 22') including a reduced diameter portion (24) with an annular groove (26) thereabout and a connector extension member (28, 28') including an inner lip (29) formed on one end thereof for engagement with said groove (26) to prevent relative longitudinal movement between said shaft (22, 22') and said connector extension member (28, 28').

11. An assembly as set forth in claim 10 further characterized by said connector extension member (28, 28') extending from and moveable with said connector member (20, 20') for sliding telescopic movement relative to said conduit extension member (18, 18') over a predetermined overlapping length therebetween to telescopically support the connector member (20, 20') for longitudinal movement relative to said conduit means (12).

12. An assembly as set forth in claim 11 further characterized by said shaft (22) being elongated for slidably retaining said enlarged end portion (34) within said channel (34) for movement of said enlarged end portion (34) therealong to effect a lost motion connection between said shaft (22) and said core element.

13. An assembly as set forth in claim 12 further characterized by said connector extension member (28, 28') comprising an elongated male slider member (28) and said conduit extension member (18, 18') comprising an elongated female conduit extension member (18) slideably supporting said male slider member (28) for telescopic movement of said male slider member (28) within said female conduit extension member (18) over said predetermined overlapping length.

14. An assembly as set forth in claim 12 further characterized by said connector extension member (28, 28') comprising an elongated female slider member (28') and said conduit extension member (18, 18') comprising an elongated male conduit extension member (18') slideably supporting said female slider member (28') for telescopic movement of said female slider member (28') about said male conduit extension member (18') over said predetermined overlapping length.

15. An assembly as set forth in claim 9 further characterized by said conduit extension member (18") comprising a female conduit extension member (18") dimensioned for slideably receiving said shaft (22, 22') within said female conduit extension member (18").

16. An assembly as set forth in claim 15 further characterized by said female conduit extension member (18") including means for pivotally securing said female conduit extension member (18") to said conduit means (12).

17. An assembly as set forth in claim 16 further characterized by said shaft (22) being elongated for slideably retaining said enlarged end portion (34) within said channel (32) for movement of said enlarged end portion (34) therealong to effect a lost motion connection between said shaft (22) and said core element (30).

18. A motion transmitting remote control assembly of the type for transmitting forces along a curved path by a motion transmitting core element, said assembly comprising: a flexible conduit (14); a flexible core element (30) moveably supported by said conduit (14) with a slug (34) fixedly secured to one end of said core element (30) for movement therewith; a shaft (22, 22') defining a channel (32, 32') therein with an opening (37) at one end thereof for receiving said slug (34) into said channel (32, 32'), said channel (32, 32') including an engaging wall (33) disposed oppositely of said opening (37) in another end of said shaft (22, 22'), said engaging wall (33) having an aperture (35) therethrough for slideably receiving said core element (30) into said channel (32, 32'); a plug (38) disposed in said opening (37) for preventing escapement of said slug (34) from said channel (32, 32'), said plug (38) including a shank portion (39) extended into said opening (37) and dimensioned for a press-fit within said opening (37) to resist inadvertent removal, said plug (38) including a cap portion (41) positioned over said opening (37) to limit the insertion of said plug (38) into said opening (37); a plurality of longitudinally spaced annular barb-shaped projections formed on said one end of said shaft (22, 22') presenting annular planar surfaces (44); and a terminal member (46) molded to said one end of said shaft (22, 22') about said cap portion (41) of said plug (38) and said opening (37) and about said annular projections of said shaft (22, 22') defining mating surfaces (48) mating with mating surfaces (44) of said shaft (22, 22') for interconnecting said terminal member (46) and said shaft (22, 22') to prevent relative movement therebetween, said terminal member (46) including a flange portion (50) having a hole (52) therethrough adapted for connection to a controlled member.

* * * * *